(12) United States Patent
Klebanoy et al.

(10) Patent No.: US 6,606,450 B1
(45) Date of Patent: Aug. 12, 2003

(54) METHOD AND APPARATUS FOR PROCESSING VIDEO SIGNALS HAVING ASSOCIATED ACCESS RESTRICTION DATA

(75) Inventors: Tlya Klebanoy, Vaughan (CA); Edward G. Callway, Toronto (CA); Wai Lo, Richmond Hill (CA); Ivan W. Y. Yang, Markham (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/316,441

(22) Filed: May 21, 1999

Related U.S. Application Data (63) Continuation-in-part of application No. 08/878,249, filed on Jun. 16, 1997, now Pat. No. 6,356,704.

(51) Int. Cl.$^7$ ................................................ H04N 5/91
(52) U.S. Cl. ........................................ 386/94; 380/203
(58) Field of Search .................... 386/94–95; 360/60; 380/203, 242; 705/57, 53, 58; H04N 5/91

(56) References Cited

U.S. PATENT DOCUMENTS

| | | | |
|---|---|---|---|
| 4,945,563 A | * 7/1990 | Horton et al. | 380/203 |
| 5,231,546 A | 7/1993 | Shimada | |
| 5,315,448 A | * 5/1994 | Ryan | 386/94 |
| 5,319,705 A | 6/1994 | Halter et al. | |
| 5,418,853 A | * 5/1995 | Kanota et al. | 386/94 |
| 5,568,551 A | * 10/1996 | Kawashima | 705/53 |
| 5,638,443 A | * 6/1997 | Stefik et al. | 705/54 |
| 5,764,964 A | * 6/1998 | Dwin et al. | 348/739 |
| 5,799,081 A | * 8/1998 | Kim et al. | 380/203 |
| 5,889,919 A | * 3/1999 | Inoue et al. | 386/94 |
| 6,034,931 A | 3/2000 | Miwa et al. | |
| 6,347,846 B1 | * 2/2002 | Nakamura | 308/203 |
| 6,351,439 B1 | 2/2002 | Miwa et al. | |

FOREIGN PATENT DOCUMENTS

| | | |
|---|---|---|
| EP | 0814474 A1 | 12/1997 |
| EP | 0942418 A1 | 9/1999 |
| WO | WO 97/43853 | 11/1997 |
| WO | WO 98/16926 | 4/1998 |

OTHER PUBLICATIONS

European Search Report to Application EP 00 30 4257.9–2002 (European Patent Office dated May 6, 2002.

* cited by examiner

Primary Examiner—Vincent Boccio
(74) Attorney, Agent, or Firm—Vedder, Price, Kaufman & Kammholz (57) ABSTRACT

A method and apparatus that includes processing for restricting usage of video signals in accordance with associated access restriction data begins by detecting the presence of the associated access restriction data as video signals are being received. The processing continues by interpreting usage instructions regarding the video signal. Such usage instructions may be requesting a digital copy of the video signals be made, sending the video signals to a television output, and/or sending a file of the digital video signal to another party via a file transfer. The processing continues by restricting usage of these video signals as requested by the usage instruction when prohibited by the associated access restriction data.

30 Claims, 4 Drawing Sheets

METHOD AND APPARATUS FOR PROCESSING VIDEO SIGNALS HAVING ASSOCIATED ACCESS RESTRICTION DATA

This patent application is a continuation-in-part of patent application entitled "Method and Apparatus for Detecting Protection of Audio and Video Signals" having a Ser. No. of 08/878,249 U.S. Pat. No. 6,356,704, having a filing date of Jun. 16, 1997, and is assigned to the same assignee as the present application.

TECHNICAL FIELD OF THE INVENTION

This invention relates generally to video signal processing and more particularly to restricting access to such video signals based on associated access restriction data.

BACKGROUND OF THE INVENTION

Unauthorized copying of copyrighted works is, unfortunately, very prevalent. Such unauthorized copying ranges from simple copying of a few pages of a copyrighted book to widespread distribution of millions of dollars worth of illegally copied movies, compact discs, and other entertainment medium.

With the advent of digital videodiscs (DVD) the illegal copying of DVDs is of great concern to content companies (i.e., the companies owning the copyrighted work recorded on the DVDs). To protect the copyrighted works, content companies are demanding that DVD producers incorporate a security mechanism to prevent unauthorized copying. One such recommended security mechanism is currently being used in conjunction with videocassette recorders and was developed by Macrovision.

The Macrovision technique (hereinafter referred to as Macrovision) essentially places additional coding in the vertical blanking interval and/or horizontal sync signals of a video stream provided to a television for display. The television can filter out the additional coding with negligible video effects, but a video cassette record (VCR) is not able to filter out the additional coding, thereby preventing the VCR from making quality copies.

While Macrovision prevents VCRs from making quality copies, it does not prevent unauthorized copying for a VCR, or any other video source (including a DVD player) coupled to a personal computer (PC). As is generally known, a PC may be equipped with an analog video decoder, such as one contained in the All-in-Wonder manufactured and distributed by ATI International, which converts an analog video signal into a digital video data stream. The analog video stream may have been originated by a video source such as a DVD player, a VCR, television broadcast, cable broadcast, etc. The analog-to-digital conversion (ADC) of the analog video stream typically removes the Macrovision encoding. As such, a DVD player, or other video source, that sources an analog video stream to a PC may have the copyrighted work copied without the Macrovision encoding due to the ADC. Such unauthorized copying is unacceptable to content providers.

Therefore, a need exists for a method and apparatus that restricts usage of video signals in accordance with associated access restriction data, such as Macrovision.

BRIEF DESCRIPTION OF THE INVENTION

DETAILED DESCRIPTION OF A INVENTION

Generally, the present invention provides a method and apparatus that includes processing for restricting usage of video signals in accordance with associated access restriction data. Such processing begins by detecting the presence of the associated access restriction data as video signals are being received. The processing continues by interpreting usage instructions regarding the video signal. Such usage instructions may be requesting a digital copy of the video signals be made, sending the video signals to a television output, and/or sending a file of the digital video signal to another party via a file transfer. The processing continues by restricting usage of these video signals as requested by the usage instruction when prohibited by the associated access restriction data. With such a method and apparatus, video signals that include access restriction data may be processed by a computer system without loss of the access restriction included by the content providers.

Figure 1:
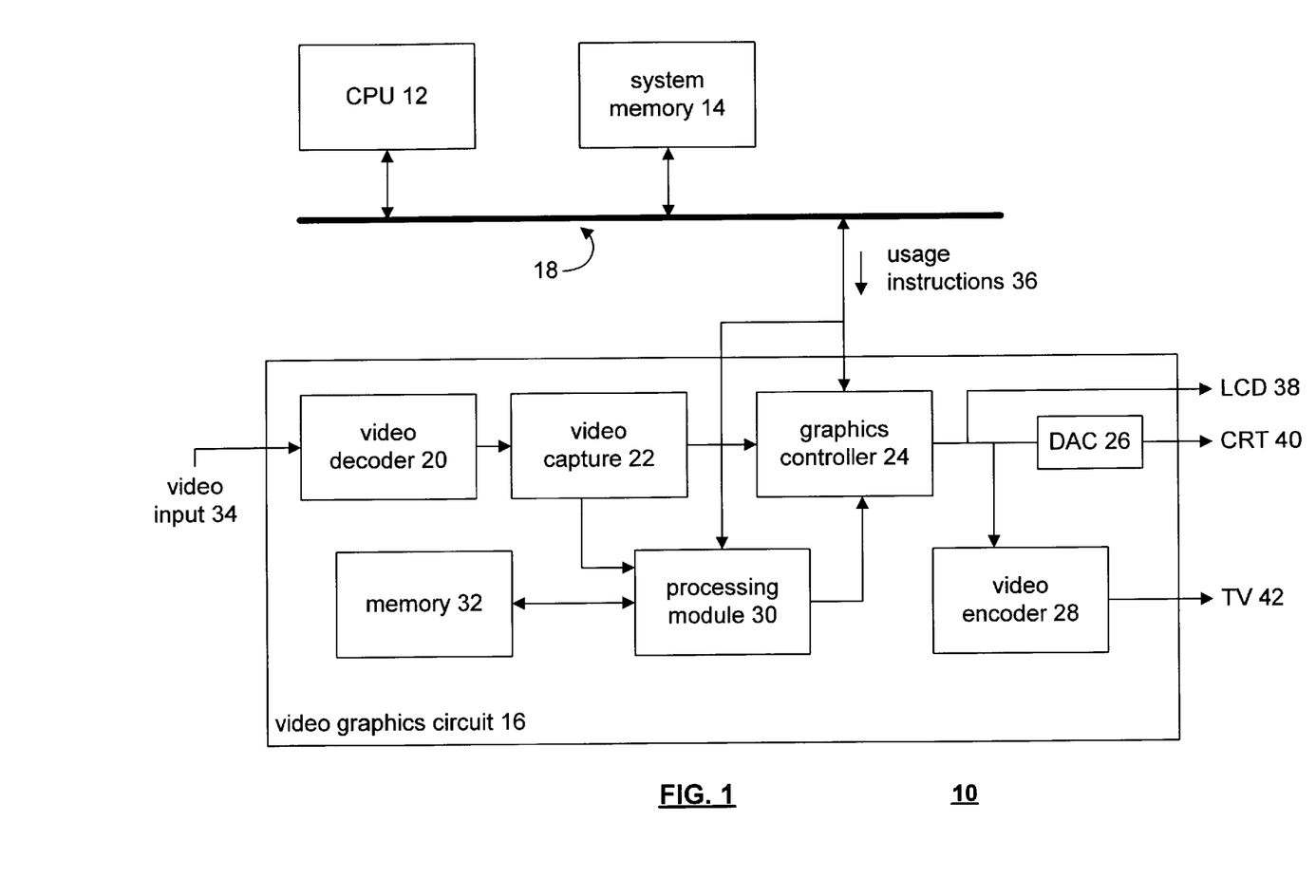
FIG. 1 illustrates a schematic block diagram of a computer system in accordance with the present invention.

The present invention can be more fully described with reference to FIGS. 1–4. FIG. 1 illustrates a schematic block diagram of a computer 10 that includes a central processing unit 12, system memory 14, a video graphics circuit 16, and a bus 18. The central processing unit 12, the system memory 14, and the bus 18 may be of the type found in personal computers, set top boxes, workstations, and/or laptop computers. As one of average skill in the art will appreciate, a computer includes more elements than shown in FIG. 1, but such elements have been omitted for clarity of discussion of the present invention.

The central processing unit 12, via a user interface, receives requests for usage of received video signals. The central processing unit 12 processes such requests and provides usage instructions 36 to the video graphics circuit 16, which includes a video decoder 20, a video capture module 22, a graphics controller 24, a digital-to-analog converter 26, a video encoder 28, a processing module 30 and memory 32. The video decoder 20, video capture module 22, graphics controller 24, digital-to-analog converter 26, and video encoder 28 may be of the type found in the All-in-Wonder board produced and manufactured by ATI International. The processing module 30 may be a single processing device or a plurality of processing devices. Such a processing device may be a microprocessor, microcontroller, digital signal processor, microcomputer, a portion of the processing resources within the graphics controller 24, within the central processing unit 12, and/or any device that manipulates data based on operational instructions. The memory 32 may be a single memory device or a plurality of memory devices. Such a memory device may be a read-only memory, random access memory, floppy disk memory, magnetic tape memory, memory contained within the graphics controller and/or video decoder 20, a portion of the system memory 14, and/or any device that stores digital information. Note that if the processing module 30 implements one or more of its functions via a state machine or logic circuitry, the memory storing the corresponding operational instructions is embedded within the circuitry comprising the state machine and/or logic circuitry.

In operation, the video graphic circuit 16 receives a video input 34 via the video decoder 20. The video decoder 20 digitizes the video input signals 34 and causes them to be stored in the video capture module 22. The graphics controller 24 retrieves the digitized video signals from the video capture 22 in accordance with the usage instructions 36. For example, the usage instructions may indicate that a portion of the display, which may be an LCD panel, a CRT monitor 40, or a television set 42, is to have a window displaying the video, the background to display the video, or full screen video. The usage instructions 36 are also provided to the processing module 30, as well as the digitized video input signals. The processing module 30, as will be discussed in greater detail with reference to FIGS. 3 and 4, produces a digital signature of the lines within the vertical blanking interval. The digital signature is then used to reconstruct a data pattern that is used to determine whether the input video signals include valid associated access restriction data. Such access restriction data may be any one of a plurality of forms of Macrovision encoding. As one of average skill in the art will readily appreciate, the access restriction data may be of other forms that utilize the vertical blanking interval to provide an indication as to how the video signals are to be processed.

The processing module 30, having recognized valid access restriction data, restricts the usage of video signals in accordance with the access restriction data. For example, if the usage instructions 36 requested that the video signals be displayed, the processing module 30 would allow the video signals to be displayed but would further enable an access restriction signal, which when provided to the video encoder 28, would cause the video encoder 28 to reinsert the access restriction data into the video signals. As such, the television output 42 would include the access restriction data within the video signals. Alternatively, the processing module 30 may prevent the graphics controller 24 from providing the digitized video signals to system memory for storage or preventing it from providing the digitized video signals to any other memory for storage. In addition, the processing module 30 may provide the central processing unit with instructions that prevent the central processing unit from transporting a file of the digitized video signals to another computer via the Internet, direct connect, or other means of transferring data files from one computer to another.

In one particular embodiment, the video decoder includes hardware to detect Macrovision and generates two new private property sets: one for retrieving the current status of Macrovision process detection and another for controlling data transfer path to disable capturing of any Macrovision protected context. The property sets are propagated through the video graphics circuit as either a device property set or a stream property set. If the property set is a device property set, the processing module 30 processes video in accordance with the access restriction data without user input. However, when the property set is a stream property set, the user will have to render a VP pin prior to being permitted to view video.

To detect the current status of Macrovision, the processing module 30 may include a timer, which triggers an indication to obtain the Macrovision status. As such, at predetermined time intervals, the Macrovision status (e.g., the access restriction data) is obtained. Alternatively, the processing module may be programmed to detect changes in the status of the Macrovision. As such, the processing module will use the same access restriction data until it detects that such data has changed. Note that this embodiment is independent of the operating system employed by the computer 10.

As one of average skill in the art will appreciate for this particular embodiment, a DShow based application should render the VBI stream to allow Macrovision software detection for the case where the Macrovision protection process can not be detection by video decoder hardware. Such should also apply when video conferencing applications and/or video editing applications are operating. If Video decoder does not support Macrovision process detection in hardware, opening Video without rendering VBI stream should not be allowed.

In another embodiment, the video decoder does not include Macrovision detection hardware, thus the Macrovision is detected using a software detection algorithm, which should be applied on raw oversampled VBI data. In this embodiment, Macrovision detection code is built as an independent VBI Codec, which is connected in a standard way to the VBI pin of the capture filter to emulate similar functionality found in the video decoder of the preceding embodiment. Accordingly, a DShow TV viewing application will have to render a VBI pin, which connects it to Macrovision detection VBI codec. As one of average skill in the art will appreciate, the VBI codec may be a kernel or user mode implementation.

Figure 2:
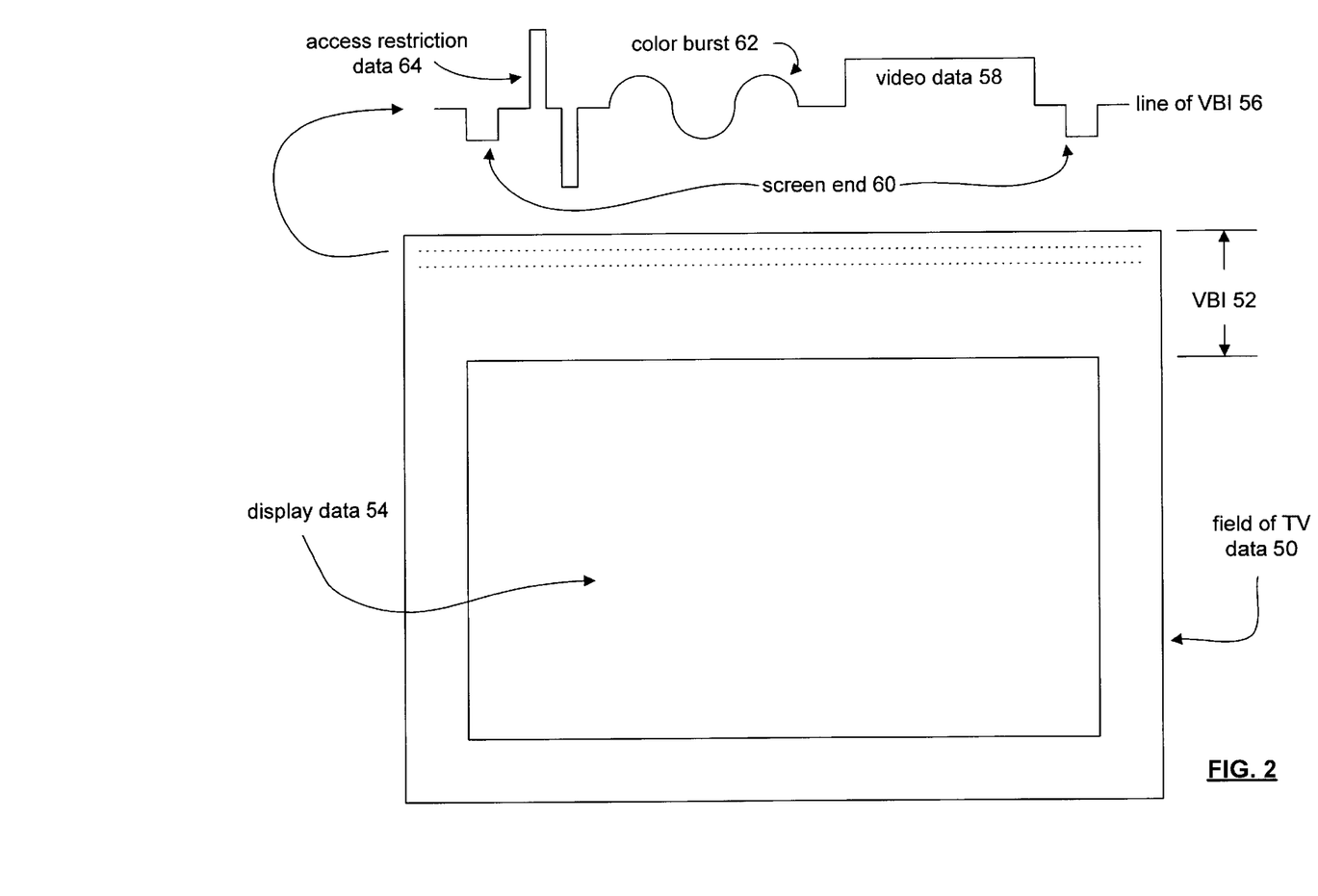
FIG. 2 illustrates a graphical representation of a field of television data in accordance with the present invention.

FIG. 2 illustrates a graphical representation of a field of television data 50. The field of data 50 includes a vertical blanking interval 52 and a display data portion 54. The vertical blanking interval 52 includes a plurality of lines as shown by a line of the vertical blanking interval 56. The display data 54 corresponds to the video data 58 that is subsequently displayed on the LCD panel, a CRT monitor, or a television. As shown, the line of the vertical blanking interval 56 includes screen end indicators 60, the access restriction data 64, color burst information 62 and the video data 58. As previously discussed, the processing module 30 takes a digital signature of the line of the vertical blanking interval 56 and utilizes the digital signature to determine whether the line includes the access restriction data. If the access restriction data 64 is not present, the video signals are processed in accordance with the usage instructions without restriction.

Figure 3:
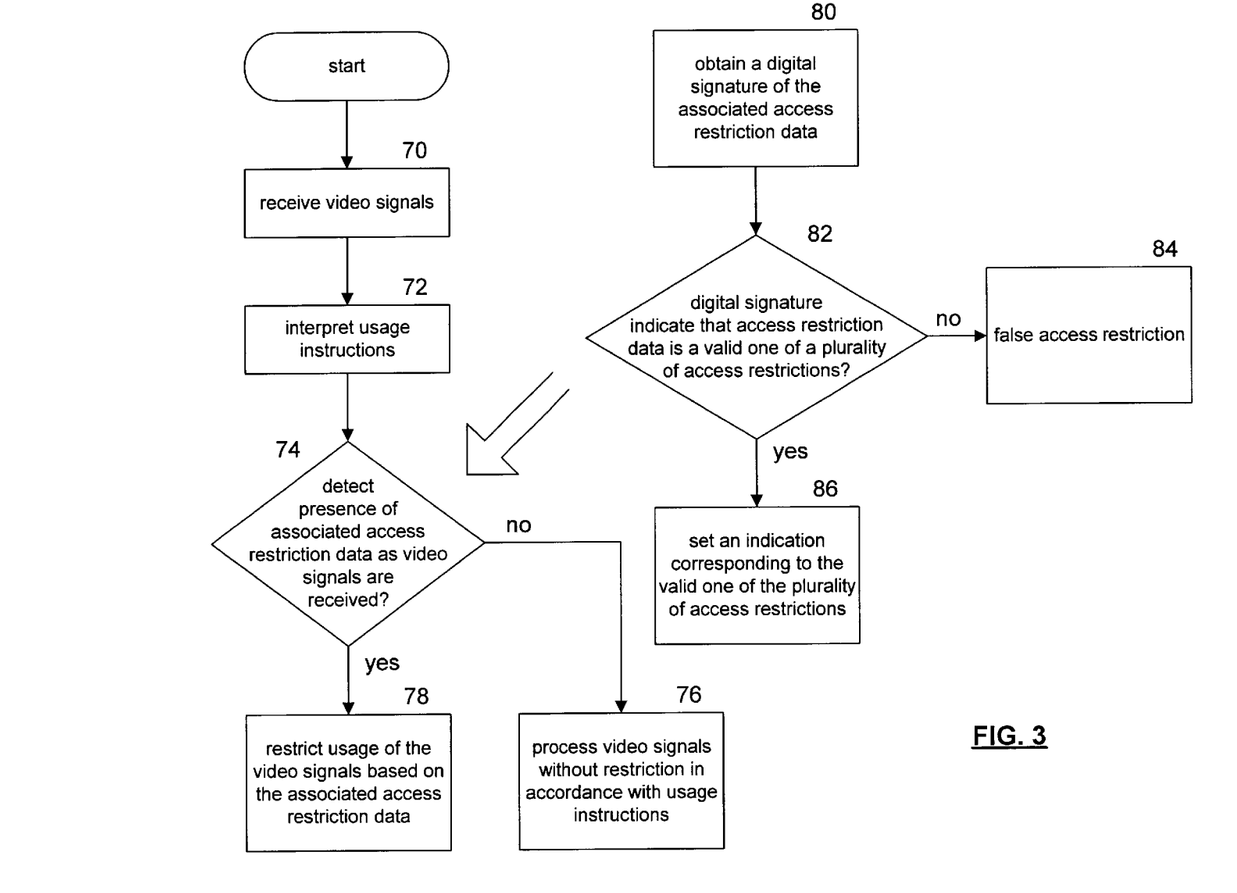
FIG. 3 illustrates a logic diagram of a method for processing video signals having associated access restriction data in accordance with the present invention.

FIG. 3 illustrates a logic diagram of a method for restricting usage of video signals having associated access restriction data. The process begins at step 70 where video signals are received. The process then proceeds to step 72 where usage instructions are interpreted. The process then proceeds to step 74 where a determination is made as to whether the presence of associated access restriction data are detected within the video signals as they are received. If not, the process proceeds to step 76 where the video signals are processed without restriction in accordance with usage instructions. Note that the manner in which the associated access restriction data is detected will be discussed in greater detail with reference to steps 80 through 86.

If the associated access restriction data is detected, the process then proceeds to step 78. Note that the detection of the associated access restriction data may further include interpreting the associated access restriction data to determine the manner in which the usage of the video signals is to be prevented. At step 78, the usage of the video signals is restricted in accordance with the associated access restriction data. If the access restriction data is Macrovision encoding, a plurality of the Macrovision encodings may be used in a round-robin fashion to restrict the usage of the video signals. In general, the restriction of usage is dependent upon the particular usage requested. For example, if the usage request is to make a digital copy, a restriction may be preventing the making of the digital copy, enabling copy of blank data (i.e., store a black screen), enabling copy of a degraded representation of the video signal, and/or scrambling the video signal. As another example, when the usage is to send the video signal to a television output circuit (i.e., send the video signal to the television out 42 of FIG. 1), the restriction may be preventing the sending of the video signals to the television output circuit, and/or providing a restriction enable signal to the television output circuit (i.e., the video encoder 28) such that the television output circuit provides the associated access restriction data with the video signals to a television. Note that the video encoder 28 of the All-in-Wonder board includes circuitry to provide Macrovision encoding when enabled. As yet another example, when the usage is to make a digital copy, the usage restriction may include storing the video data and the associated access restriction data a, such that when the video data is subsequently retrieved, the associated access restriction data is also retrieved.

Steps 80–86 describe in greater detail the process of detecting the presence of the associated access restriction data within the video signals as they are received. At step 80, the process proceeds by obtaining a digital signature of the associated access restriction data using known techniques. The process then proceeds to step 82 where a determination is made as to whether the digital signature indicates that the associated access restriction data is a valid one of a plurality of access restrictions. If not, the process proceeds to step 84 where the process indicates that the digital signature is of a fault access restriction, thereby the video signals are used without restriction. If, however, the digital signature indicates that the access restriction is valid, the process proceeds to step 86. At step 86, an indication is set that corresponds to the valid one of the plurality of access restrictions.

Figure 4:
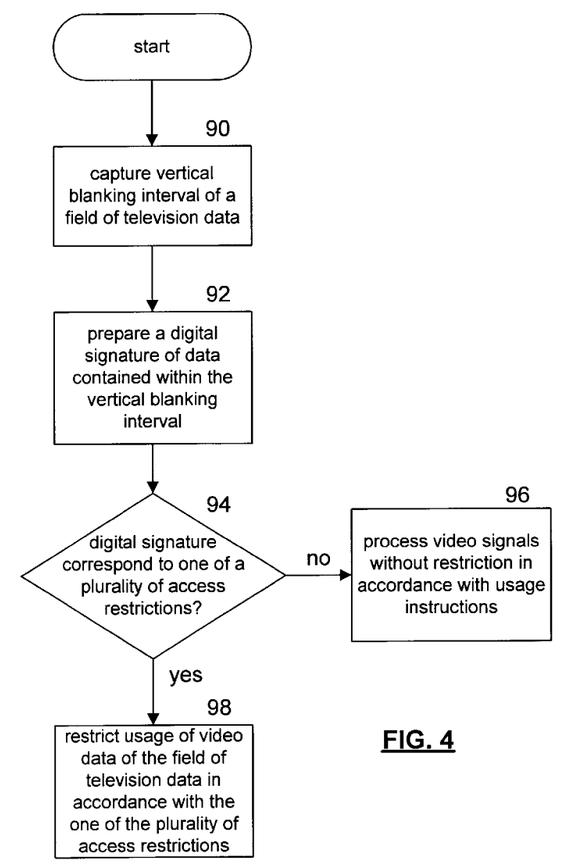
FIG. 4 illustrates a logic diagram of an alternate method for processing video signal having associated access restriction data in accordance with the present invention.

FIG. 4 illustrates a logic diagram of an alternate method for restricting usage of video signals in accordance with associated access restriction data. The process begins at step 90 where vertical blanking interval data is captured for a field of television data. The process then proceeds to step 92 where a digital signature of the data contained within the vertical blanking interval is prepared. The process then proceeds to step 94 where a determination is made as to whether the digital signature corresponds to one of a plurality of access restrictions. If not, the process proceeds to step 96 where video signals are processed in accordance with the usage instructions without restriction. If, however, the digital corresponds to one of the plurality of access restrictions, the process proceeds to step 98. At step 98, the usage of the video data of the field of television data is restricted in accordance with the identified access restriction.

The preceding discussion has provided a method and apparatus for restricting usage of video signals in accordance with associated access restriction data. Such a method and apparatus will be beneficially used within a personal computer, workstation, laptop, and/or other computing system that receives analog digital video signals that include associated restriction data, such as Macrovision, and digitizes the data. By incorporating the teachings of the present invention into such a computing system, the associated access restrictions of the video signal are properly maintained. As one of average skill in the art will appreciate, the teachings of the present invention may be utilized to develop other embodiments without deviating from the scope of the present invention.

What is claimed is:

1. A video graphics circuit comprises:

a processing module having a first processor; and memory operably coupled to the first processor of the processing module, wherein the memory stores operational instructions that cause the first processor to (a) detect presence of the associated access restriction data as the video signals are being received; (b) receive video usage instructions from a second processor and interpret said usage instructions regarding the video signals; and (c) restrict usage of the video signals as requested by the usage instructions from said second processor when said first processor determines that the requested usage instructions are prohibited by the associated access restriction data.

2. The video graphics circuit of claim 1, wherein the memory further comprises operational instructions that cause the processing module to detect the presence of the associated access restriction data by:

obtaining a digital signature of the associated access restriction data;

determining whether the digital signature indicates that the associated access restriction data is a valid one of a plurality of access restrictions;

when the associated access restriction data is the valid one, setting an indication corresponding to the valid one of the plurality of access restrictions.

3. The video graphics circuit of claim 2, wherein the memory further comprises operational instructions that cause the processing module to utilize each of the plurality of access restrictions in an established pattern to restrict the usage of the video signals.

4. The video graphics circuit of claim 1, wherein the usage includes at least one of: making a digital copy of the video signals, sending the video signals to a television output circuit, and sending a file of the video signals to another party via a file transfer.

5. The video graphics circuit of claim 4, wherein, when the usage is making a digital copy, the memory further comprises operational instructions that cause the processing module to restrict usage of the video data by at least one of: preventing the making of the digital copy, enabling copying of blank data, enabling copying of a degraded representation of the video signals, and scrambling the video signals.

6. The video graphics circuit of claim 4, wherein, when the usage is sending the video signals to a television output circuit, the memory further comprises operational instructions that cause the processing module to restrict usage of the video data by at least one of: preventing the sending of the video signals to the television output circuit, and providing a restriction enabled signal to the television output circuit such that the television output circuit provides the associated access restriction data with the video signals to a television.

7. The video graphics circuit of claim 4, wherein, when the usage is making a digital copy, the memory further comprises operational instructions that cause the processing module to prevent usage of the video data by storing the video data and the associated access restriction data such that when the video data is subsequently retrieved, the associated access restriction data is also retrieved for processing.

8. A video graphics circuit comprises:

a processing module having a first processor that is capable of receiving video usage instructions from a second processor; and memory operably coupled to the processing module, wherein the memory stores operational instructions that cause the processing module to (a) capture a vertical blanking interval of a field of television data; (b) prepare a digital signature of data contained within the vertical blanking interval; (c) receive video usage instructions from a second processor and determine whether the digital signature corresponds to one of the plurality of access restrictions; and (d) when the digital signature corresponds to the one of the plurality of access restrictions, restrict usage of video data of the field of the television data as requested by video usage instructions from said second processor in accordance with at the one of the plurality of access restrictions.

9. The video graphics circuit of claim 8, wherein the memory further comprises operational instructions that cause the processing module to restrict the usage by utilizing each of the plurality of access restrictions in an established pattern to restrict the usage of the video data.

10. The video graphics circuit of claim 8, wherein the usage includes at least one of: making a digital copy of the video data, sending the video data to a television output circuit, and sending a file of the video data to another party via a file transfer.

11. The video graphics circuit of claim 10, wherein, when the usage is making a digital copy, the memory further comprises operational instructions that cause the processing module to restrict the usage by at least one of: preventing the making of the digital copy, enabling copying of blank data, enabling copying of a degraded representation of the video data, and scrambling the video data.

12. The video graphics circuit of claim 10, wherein, when the usage is sending the video data to a television output circuit, the memory further comprises operational instructions that cause the processing module to restrict the usage by at least one of: preventing the sending of the video data to the television output circuit, and providing a restriction enabled signal to the television output circuit such that the television output circuit provides the associated access restriction data with the video data to a television.

13. The video graphics circuit of claim 10, wherein, when the usage is making a digital copy, the memory further comprises operational instructions that cause the processing module to restrict the usage by storing the video data and the associated access restriction data such that when the video data is subsequently retrieved, the associated access restriction data is also retrieved for processing.

14. A video graphics circuit comprising:
 a video decoder for receiving and digitizing a video signal;
 a processing module, operably coupled to the video decoder and to a bus, said bus capable of being coupled to a second processor, the processing module operable to recognize access restriction data within the video signal, to receive usage instructions from a second processor for the video data over the bus, and to restrict usage of the video data as requested by the usage instructions when the requested usage is prohibited by the access restriction data; and
 a video encoder operably coupled to the processing module and video decoder, the video encoder operable to reinsert the access restriction data into the video signal before sending the video signal to a video signal input.

15. The graphics circuit of claim 14 wherein the processing module is further operable to prevent the sending of the video signal to the television output in response to the access restriction data when a received usage instruction is to send the video signal to the television output.

16. The graphics circuit of claim 14 wherein the processing module is further operable to scramble the video signal when a usage instruction to male a digital copy of the video signal is received and the access restriction data prohibits making a digital copy.

17. The graphics circuit of claim 14 wherein the processing module is further operable to copy blank data when a usage instruction to make a digital copy of the video signal is received and the access restriction data prohibits making a digital copy.

18. The graphics circuit of claim 14 wherein the processing module is further operable to, responsive to the access restriction data, send notification over the bus to prevent transport of a file of the digitized video signal to another computer via the Internet, direct connect, or other means of transferring data files from one computer to another.

19. The graphics circuit of claim 14, wherein the processing module is further operable to, responsive to the access restriction data, send notification over the bus to prevent transport of a file of the digitized video.

20. The graphics circuit of claim 14 further comprising:
 a CRT output operably coupled to the processing module and video decoder.

21. The graphics circuit of claim 14 further comprising;
 an LCD output operably coupled to the processing module and video decoder.

22. A method for processing video signals having associated access restriction data embedded in said signals, the method comprises the steps of:
 a) receiving at a first processor, video usage instructions that are sent to said first processor from a second processor;
 b) detecting by said first processor, the presence of associated access restriction data in said video signals that are received by said first processor, as the video signals are being
 c) interpreting by said first processor, the video usage instructions received by the first processor from the second processor regarding usage of the video signal and
 d) said first processor restricting usage of the video signals as requested by the usage instructions from the second processor, when prohibited by the associated access restriction data.

23. The method of claim 22, wherein step b) further comprises:
 obtaining a digital signature of the associated access restriction data;
 determining whether the digital signature indicates that the associated access restriction data is a valid one of a plurality of access restrictions; and
 when the associated access restriction data is a valid one, setting an indication corresponding to the valid one of the plurality of access restrictions.

24. The method of claim 23, wherein step (c) further comprises utilizing each of the plurality of access restrictions in an established pattern to restrict the usage of the video signals.

25. The method of claim 22, wherein the plurality of access restrictions corresponds to a plurality of MACROVISION signals.

26. The method of claim 22 wherein the file transfer occurs over the Internet.

27. The method of claim 22 wherein the file transfer is from one computer to another.

28. A method for processing video signals having associated access restriction data embedded in said video signals, the method comprises the steps of:

a) receiving at a first processor, video usage instructions that are sent to said first processor from a second processor;

b) detecting by said first processor, the presence of the associated access restriction data in said video signals as said video signals are received by said first processor;

c) said first processor interpreting usage instructions sent to said first processor from said second processor regarding the video signals; and d) said first processor restricting usage of the video signals as requested by the usage instructions from the second processor when prohibited by the associated access restriction data, wherein the requested usage is making a copy and a restriction is preventing the making of a copy by scrambling the video signals.

29. The method of claim 28 further comprising interpreting the associated restriction data to determine a manner in which usage is to be restricted.

30. A method for processing video signals having associated access restriction data embedded in said video signals, the method comprising the steps of a) receiving at a first processor, video usage instructions that are sent to said first processor from a second processor;

b) capturing a vertical blanking interval of a field of television data;

c) preparing a digital signature of data contained within the video blanking interval;

d) determining, by said first processor, whether the digital signature corresponds to one of a plurality of access restrictions;

e) determining, by said first processor, if the one of the plurality of access restrictions restricts copying of the television data if said video usage instructions request copying of the television data; and f) directing the scrambling of the television data by the first processor when the access restriction restricts copying of the television signal.

* * * * *

UNITED STATES PATENT AND TRADEMARK OFFICE
CERTIFICATE OF CORRECTION

PATENT NO.    : 6,606,450 B1
DATED         : August 12, 2003
INVENTOR(S)   : Ilya Klebanov et al.

It is certified that error appears in the above-identified patent and that said Letters Patent is hereby corrected as shown below:

<u>Title page,</u>
Item [75], please delete "Tlya Klebanoy" and replace with the following:
-- Ilya Klebanov --

Signed and Sealed this

Twenty-third Day of December, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,606,450 B1 | Page 1 of 1 |
| APPLICATION NO. | : 09/316441 | |
| DATED | : August 12, 2003 | |
| INVENTOR(S) | : Ilya Klebanoy et al. | |

It is certified that error appears in the above-identified patent and that said Letters Patent is hereby corrected as shown below:

Column 6, line 7, Claim 1, delete "the".
Column 6, line 8, Claim 1, delete "the".
Column 7, line 54, Claim 14, delete "a" and replace with "the".

Signed and Sealed this

Twenty-eighth Day of June, 2011

David J. Kappos
*Director of the United States Patent and Trademark Office*